(12) United States Patent
Ito

(10) Patent No.: US 6,442,347 B1
(45) Date of Patent: Aug. 27, 2002

(54) CAMERA

(75) Inventor: Kenji Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/624,585

(22) Filed: Jul. 24, 2000

(30) Foreign Application Priority Data

Jul. 27, 1999 (JP) ............................................ 11-211925

(51) Int. Cl.[7] .............................................. G03B 15/03
(52) U.S. Cl. ........................ 396/176; 396/538; 396/539
(58) Field of Search ................................. 396/539, 542, 396/205, 206, 176, 177, 178, 538

(56) References Cited

U.S. PATENT DOCUMENTS

| | | | | |
|---|---|---|---|---|
| 4,519,687 A | * | 5/1985 | Kuge ............................ | 396/538 |
| 4,601,562 A | * | 7/1986 | Yoneyama et al. .......... | 396/538 |
| 5,884,112 A | * | 3/1999 | Funahashi et al. ........... | 396/535 |
| 6,091,906 A | * | 7/2000 | Hata ............................ | 396/206 |
| 6,137,960 A | * | 10/2000 | Komatsuzaki et al. ....... | 396/539 |
| 6,226,456 B1 | * | 5/2001 | Hazama et al. .............. | 396/178 |

* cited by examiner

Primary Examiner—David M. Gray
(74) Attorney, Agent, or Firm—Robin, BLecker & Daley

(57) ABSTRACT

A camera includes a cartridge chamber into which a film cartridge is loaded, a spool chamber in which a spool arranged to take up thereon a film pulled out from the film cartridge is provided, a battery chamber which houses a battery therein, and a capacitor which accumulates electric charge for flash light emission, wherein one of the battery chamber and the capacitor is disposed above the spool chamber, and the other of the battery chamber and the capacitor is disposed below the spool chamber.

10 Claims, 3 Drawing Sheets

CAMERA

BACKGROUND OF THE INVENTION

1. Field of the Invention

The present invention relates to a camera having a battery stowing part and a capacitor for flash light emission disposed therein.

2. Description of Related Art

Cameras are desired to be compact as a whole for portability and operability. Therefore, an efficient layout of parts is necessary for having them arranged as compact as possible. This is important particularly to a camera designed to have large parts, such as a battery and a capacitor for a flash device, disposed inside the camera. In such a case, such large parts must be carefully disposed in relation to component parts essential to photo-taking., such as a photo-taking lens barrel, a cartridge chamber, a spool chamber, a viewfinder device, a distance measuring device, a film transport device, a flash device and a display device for displaying information of varied kinds.

For example, in the case of a camera disclosed in Japanese Laid-Open Patent Application No. Hei 7-295048 (corresponding to U.S. patent application Ser. No. 08/423,902), a battery stowing part is disposed above a spool chamber, and a capacitor for a flash device is disposed below an aperture part.

Further, in the case of a camera disclosed in Japanese Laid-Open Patent Application No. Hei 8-278543 (corresponding to U.S. patent application Ser. No. 08/423,902), either a battery stowing part or a capacitor for a flash device is disposed above or below a spool chamber.

Further, in the case of a camera disclosed in Japanese Laid-Open Patent Application No. Hei 10-39387, a capacitor for a flash device is disposed inside a film take-up spool disposed in a spool chamber, and a battery stowing part is disposed below the spool chamber.

BRIEF SUMMARY OF THE INVENTION

In accordance with one aspect of the invention, there is provided a camera arranged to permit reduction in size thereof by disposing one of a battery chamber and a capacitor for a flash device above a spool chamber and disposing the other of the battery chamber and the capacitor below the spool chamber.

The above and other aspects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

(First Embodiment)

Figure 1:
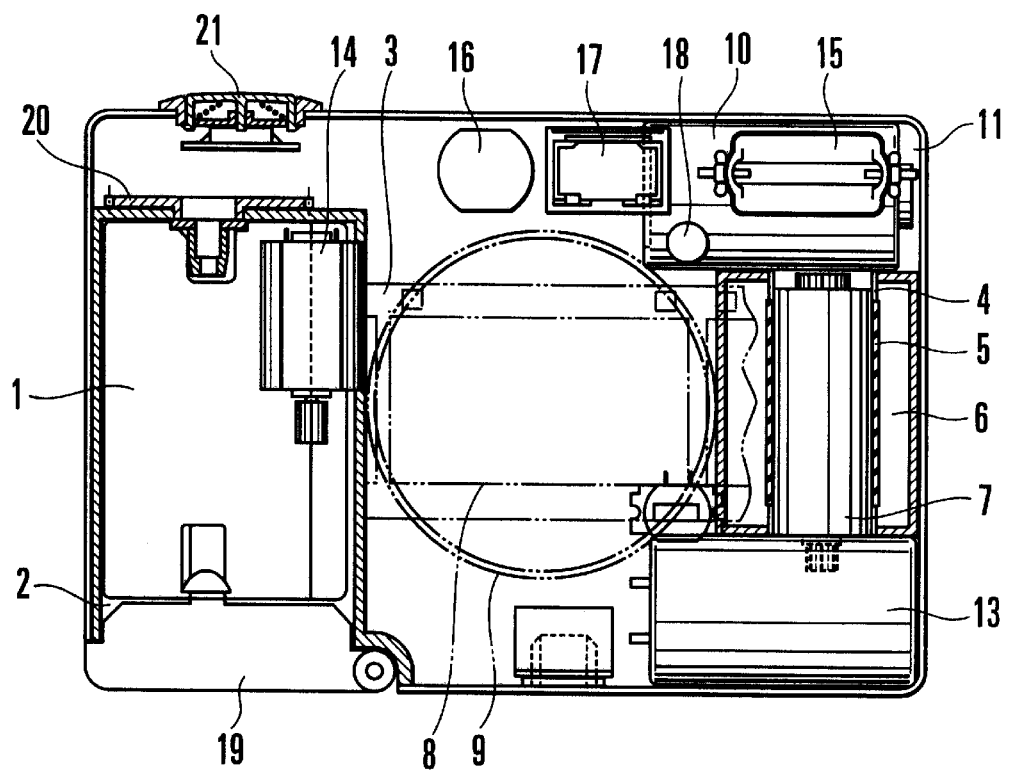
FIG. 1 is a sectional view showing the front side of a camera according to a first embodiment of the invention.
Figure 2:
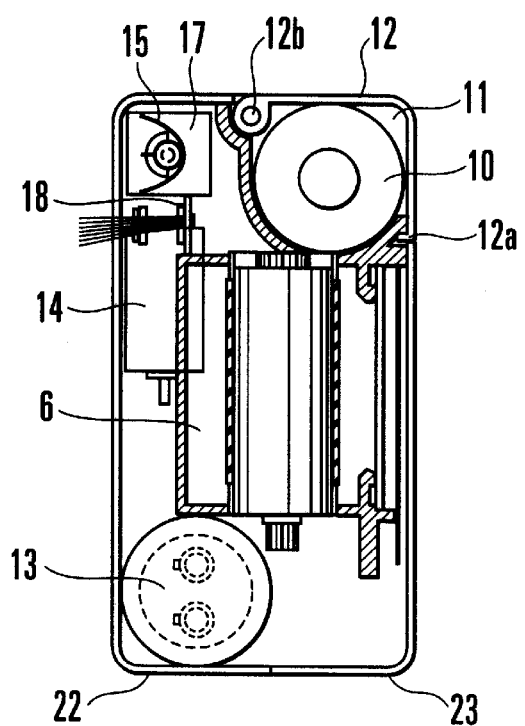
FIG. 2 is a sectional view showing one side of the camera according to the first embodiment.

FIGS. 1 and 2 show the construction of a camera according to a first embodiment of the invention. FIG. 1 is a sectional view showing the front side of the camera, and FIG. 2 is a sectional view showing one side of the camera.

In FIGS. 1 and 2, there are illustrated a film cartridge 1, a cartridge chamber 2 for housing the film cartridge 1 therein, and a film 3 pulled out from the film cartridge 1.

A spool chamber 6 is arranged to stow therein the film 3 pulled out from the film cartridge 1. A take-up spool 4 is disposed within the spool chamber 6 to take up and wind the film 3 thereon. A spool rubber 5 is provided around the take-up spool 4 to facilitate winding the film 3 around the periphery of the take-up spool 4.

A film transport motor 7 for transporting the film 3 is housed inside the take-up spool 4.

An aperture 8 is provided between the cartridge chamber 2 and the spool chamber 6 for exposing to light the film 3 sent out from the film cartridge 1. A lens barrel 9 is arranged to be drawn into the body of the camera and to permit a zooming operation thereon.

A battery 10 which is in a cylindrical shape is used as a power source of the camera. A battery chamber 11 which is arranged to house the battery 10 therein is disposed at a portion near to the rear side of the camera body above the spool chamber 6 in such a way as to extend in the right-and-left direction (in the width direction).

A battery chamber cover 12 is arranged to be opened and closed, by swinging around a hinge shaft 12b, for inserting and taking out the battery 10 into and from the battery chamber 11 on the rear side of the camera body. For this purpose, a claw part 12a is formed at the fore end part of the battery chamber cover 12. The claw part 12a is arranged to be hooked on the camera body when the battery chamber cover 12 is closed, so that the battery chamber cover 12 can be prevented from being inadvertently opened.

A main capacitor 13 for a flash device, which is in a cylindrical shape, is disposed at a portion near to the front side of the camera body below the spool chamber 6 in such a way as to extend in the right-and-left direction (in the width direction). In the rear of the main capacitor 13, an output part of the film transport motor 7 protrudes from the spool chamber 6. Further, parts disposed in the rear of the main capacitor 13 include a film transport mechanism arranged to transmit the rotation of the output part of the film transport motor 7 to the spool 4 and to a fork gear 20 provided for driving a spool disposed within the film cartridge 1.

A lens barrel driving motor 14 which is arranged to drive the lens barrel 9 to move to a drawn-in position or to a zoomed position is disposed in a space near to the lens barrel 9 in front of the cartridge chamber 2.

A flash light emitting part 15 of the flash device is arranged to illuminate an object of shooting with light in photo-taking. The flash light emitting part 15 is disposed at a portion near to the front side of the camera body above the spool chamber 6. An objective window 16 of a viewfinder for viewing the object of shooting is disposed above the lens barrel 9. A distance measuring unit 17 is arranged to measure a distance to the object of shooting, and a light measuring sensor 18 is arranged to measure the luminance of the object of the shooting. A part of the distance measuring unit 17 and the light measuring sensor 18 are disposed at a portion near to the front side above the spool chamber 6 in such a way as to be juxtaposed by the side of the flash light emitting part 15.

A cartridge chamber cover 19 is arranged to be opened and closed for placing the film cartridge 1 in or taking the film cartridge 1 out from the cartridge chamber 2.

A release button 21 is provided for causing the camera to begin a photo-taking operation. A front cover 22 is arranged to cover the front side of the camera body. A rear cover 23 is arranged to cover the rear side of the camera body.

In the above-stated arrangement of the camera, the battery chamber 11 and the main capacitor 13 are dispersedly disposed respectively above and below the spool chamber 6, which is smaller than the cartridge chamber 2 in the size in the up-and-down direction (in the height direction), while avoiding any position above or below the lens barrel 9, which occupies a large space in the middle part of the camera. This arrangement permits reduction in size of the camera both in the up-and-down direction (the height direction) and the right-and-left direction (the width direction).

In the first embodiment, the battery chamber 11 is disposed at the position near to the rear side of the camera body above the spool chamber 6. Therefore, such parts that must be disposed on the front side of the camera, such as the flash light emitting part 15, a part of the distance measuring unit 17 and the light measuring sensor 18, can be allocated by efficiently utilizing the front side of a space available above the spool chamber 6. Accordingly, the dimension of the camera in the front-and-rear direction (the depth direction) can be lessened. The arrangement also permits the battery chamber cover 12 to be disposed on the rear side of the camera body where a space can be relatively easily found for the battery chamber cover 12.

Further, since the main capacitor 13 is disposed at the portion near to the front side of the camera body below the spool chamber 6, it is possible to have, in the rear of the main capacitor 13, the output part of the film transport motor 7 protruding from the spool chamber 6, and the film transport mechanism, etc., disposed there. A space available below the spool chamber 6 thus can be efficiently used.

The arrangement of the first embodiment thus permits reduction in size of the whole camera and also permits the lens barrel 9 to be arranged to have a relatively large diameter.

In the case of the first embodiment, the battery chamber 11 is disposed above the spool chamber 6 and the main capacitor 13 is disposed below the spool chamber 6. However, the arrangement may be changed to have the battery chamber 11 disposed below the spool chamber 6 and the main capacitor 13 disposed above the spool chamber 6.

(Second Embodiment)

Figure 3:
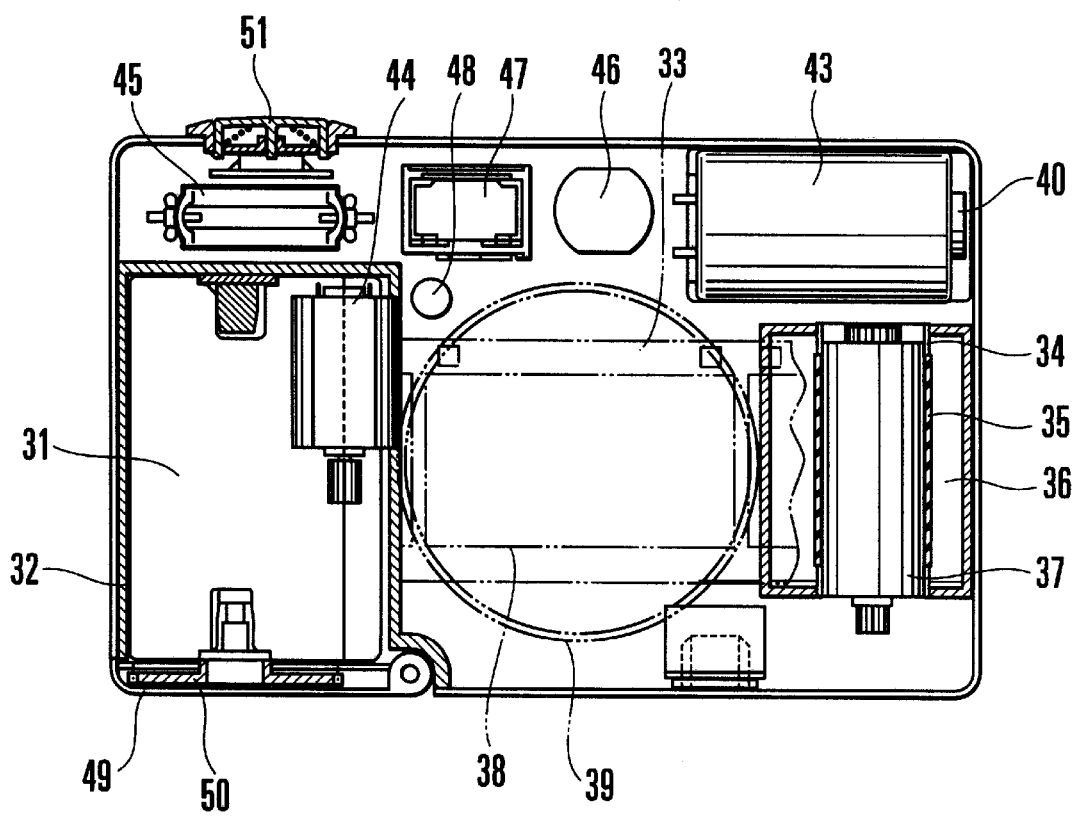
FIG. 3 is a sectional view showing the front side of a camera according to a second embodiment of the invention.
Figure 4:
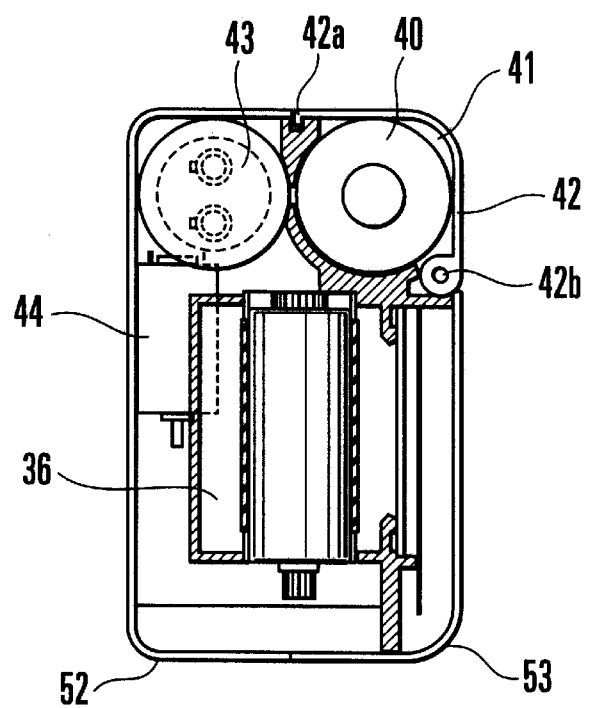
FIG. 4 is a sectional view showing one side of the camera according to the second embodiment.

FIGS. 3 and 4 show the construction of a camera according to a third embodiment of the invention. FIG. 3 is a sectional view showing a front side of the camera, and FIG. 4 is a sectional view showing one side of the camera.

In FIGS. 3 and 4, there are illustrated a film cartridge 31, a cartridge chamber 32 for housing the film cartridge 31 therein, and a film 33 pulled out from the film cartridge 31.

A spool chamber 36 is arranged to stow the film 33 pulled out from the film cartridge 31. A take-up spool 34 is disposed within the spool chamber 36 to take up and wind the film 33 thereon. The take-up spool 34 is provided with a spool rubber 35 which is arranged around the periphery of the take-up spool 34 to facilitate winding the film 33 thereon.

A film transport motor 37 for transporting the film 33 is disposed inside the take-up spool 34.

An aperture 38 is provided between the cartridge chamber 32 and the spool chamber 36 for exposing to light the film 33 sent out from the film cartridge 31. A lens barrel 39 is arranged to be drawn into the body of the camera and also to permit a zooming operation thereon.

A battery 40 which is in a cylindrical shape is used as a power source of the camera. A battery chamber 41 which is arranged to house the battery 40 therein is disposed at a portion near to the rear side of the camera body above the spool chamber 36 in such a way as to extend in the right-and-left direction (in the width direction).

A battery chamber cover 42 is arranged to be opened and closed, by swinging around a hinge shaft 42b, for inserting and taking out the battery 40 into and from the battery chamber 11 on the rear side of the camera body. For this purpose, a claw part 42a is formed at the fore end part of the battery chamber cover 42. The claw part 42a is arranged to be hooked on the camera body when the battery chamber cover 42 is closed, so that the battery chamber cover 42 can be prevented from being inadvertently opened.

A main capacitor 43 for a flash device, which is in a cylindrical shape, is disposed at a portion near to the front side of the camera body above the spool chamber 36 in such a way as to be juxtaposed with the battery chamber cover 41 in the front-and-rear direction and to extend in the right-and-left direction (in the width direction).

In a space below the spool chamber 36, an output part of the film transport motor 37 protrudes from the spool chamber 36. Further, parts disposed below the spool chamber 36 include a film transport mechanism arranged to transmit the rotation of the output part of the film transport motor 37 to the spool 34 and to a fork gear 50 provided for driving a spool disposed within the film cartridge 31.

A lens barrel driving motor 44 which is arranged to drive the lens barrel 39 to move to a drawn-in position or to a zoomed position is disposed in a space available in front of the cartridge chamber 32 on the side of the lens barrel 39.

A flash light emitting part 45 of the flash device is arranged to illuminate an object of shooting with light in photo-taking. The flash light emitting part 45 is disposed above the cartridge chamber 32. An objective window 46 of a viewfinder for viewing the object of shooting is disposed above the lens barrel 39. A distance measuring unit 47 is arranged also above the lens barrel 39 to measure a distance to the shooting object. A light measuring sensor 48 is arranged also above the lens barrel 39 to measure the luminance of the object.

A cartridge chamber cover 49 is arranged to be opened and closed for placing and taking out the film cartridge 31 in and from the cartridge chamber 32. Within the cartridge chamber cover 49, a part of the fork gear 50 is arranged to receive a driving force transmitted from the film transport mechanism. Another part of the fork gear 50 which is arranged to engage the spool disposed inside the film cartridge 31 protrudes on the inside of the cartridge chamber cover 49.

A release button 51 is provided for causing the camera to begin a photo-taking operation. A front cover 52 is arranged to cover the front side of the camera body. A rear cover 53 is arranged to cover the rear side of the camera body.

In the above-stated arrangement of the camera, the battery chamber 41 and the main capacitor 43 are disposed together above the spool chamber 36, which is smaller than the cartridge chamber 32 in the size in the up-and-down direction (in the height direction), while avoiding any position above or below the lens barrel 39, which occupies a large space in the middle part of the camera. This arrangement permits reduction in size of the camera both in the up-and-down direction (the height direction) and the right-and-left direction (the width direction). Besides, since the battery chamber 41 and the main capacitor 43 are disposed in such a way as to extend in the right-and-left direction (the width direction) of the camera, the dimension of the camera in the front-and-rear direction (the depth direction) can be prevented from increasing.

Besides, since the battery chamber 41 is disposed at the portion near to the rear side above the spool chamber 36, the battery chamber cover 42 can be arranged on the rear side of the camera body where a space can be relatively easily found for the battery chamber cover 42.

Further, since the output part of the film transport motor 37, the film transport mechanism, etc., are disposed in a relatively wide space below the spool chamber 36 where the battery chamber 41 and the main capacitor 43 are not disposed, a space available below the spool chamber 36 thus can be efficiently used, and the film transport mechanism, etc., can be designed with a larger amount of design latitude.

The arrangement of the second embodiment thus permits reduction in size of the whole camera and also permits the lens barrel 39 to be arranged to have a relatively large diameter.

Further, in the second embodiment, the flash light emitting part 45 is disposed above the cartridge chamber 32, which is larger than the spool chamber 36 in the size in the up-and-down direction (the height direction). The flash light emitting part 45, therefore, can be arranged away from the photo-taking optical axis without leaving any useless vacant space. This arrangement is effective for reduction in size of the camera as well as for prevention of a red-eye phenomenon from taking place in photo-taking with light of the flash device.

(Third Embodiment)

Figure 5:
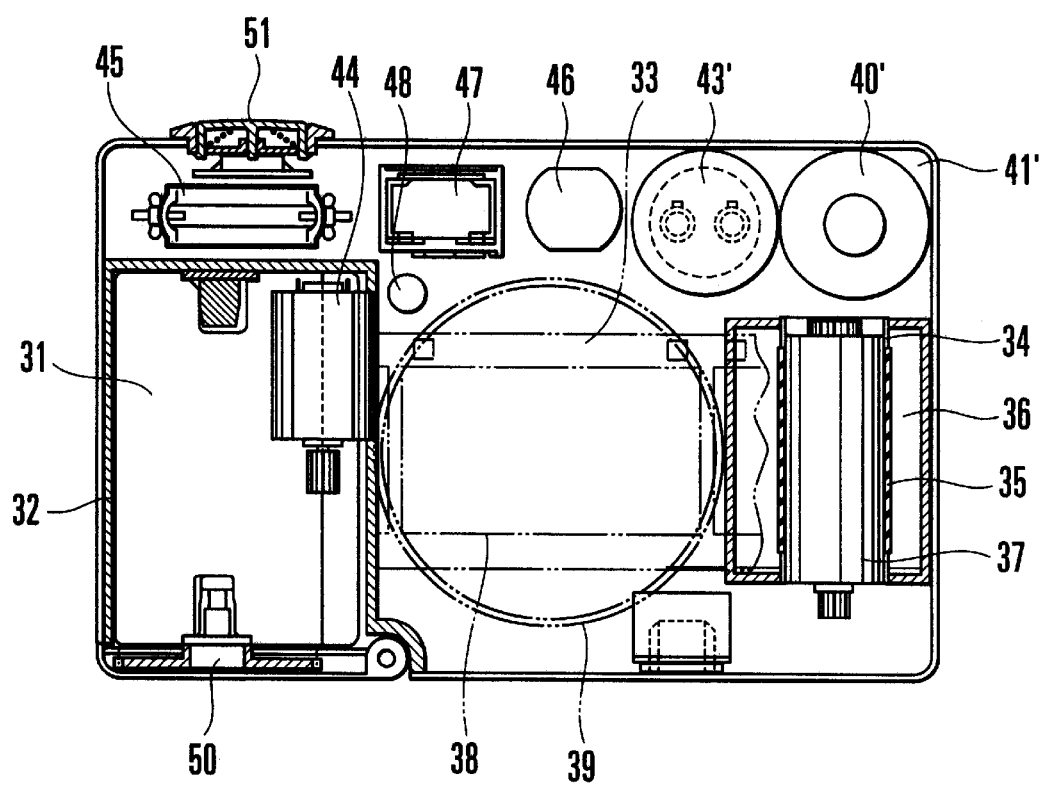
FIG. 5 is a sectional view showing the front side of a camera according to a third embodiment of the invention.

FIG. 5 is a front sectional view showing the construction of a camera according to a third embodiment of the invention. The basic construction of the third embodiment is the same as that of the second embodiment. Therefore, the component elements of the third embodiment which are the same as those of the second embodiment are denoted by the same reference numerals, and the details of them are omitted from the following description.

In the above-described second embodiment, the battery chamber 41 and the main capacitor 43 are disposed side by side in the front-and-rear direction (the depth direction) of the camera. In the case of the third embodiment, however, a battery chamber 41', which houses a battery 40' therein, and a main capacitor 43' are juxtaposed in the right-and-left direction (the width direction) of the camera above the spool chamber 36 in such a way as to extend in the front-and-rear direction. (the depth direction) of the camera.

With the battery chamber 411 and the main capacitor 43' disposed in the above-described manner, the same advantageous effects as in the second embodiment can be attained by the third embodiment, if the length of each of the battery chamber 411 and the main capacitor 43' is approximately equal to the sum of diameters of the battery chamber 41 and the main capacitor 43 of the second embodiment.

Incidentally, in the third embodiment, the battery chamber cover (not shown) may be provided either on the rear side of the camera or on one side of the camera, or at a part located between the upper side and one side of the camera.

What is claimed is:

1. A camera comprising:
   a) a cartridge chamber into which a film cartridge is loaded;
   b) a spool chamber in which a spool arranged to take up thereon a film pulled out from the film cartridge is provided;
   c) a battery chamber which houses a battery therein; and
   d) a capacitor which accumulates electric charge for flash light emission,
      wherein one of said battery chamber and said capacitor is disposed above said spool chamber, and the other of said battery chamber and said capacitor is disposed below said spool chamber, each of said battery chamber and said capacitor being in confronting relation to said spool chamber.

2. A camera according to claim 1, further comprising a flash light emission device for emitting flash light in photo-taking, said flash light emission device being disposed above said spool chamber.

3. A camera according to claim 1, further comprising a distance measuring device for measuring a distance to an object, said distance measuring device being disposed above said spool chamber.

4. A camera according to claim 1, further comprising a light measuring device for measuring luminance of an object, said light measuring device being disposed above said spool chamber.

5. A camera comprising:
   a) a cartridge chamber into which a film cartridge is loaded;
   b) a spool chamber in which a spool arranged to take up thereon a film pulled out from the film cartridge is provided;
   c) a battery chamber which houses a battery therein; and
   d) a capacitor which accumulates electric charge for flash light emission,
      wherein one of said battery chamber and said capacitor is disposed at a portion near to a rear side of said camera above said spool chamber, and the other of said battery chamber and said capacitor is disposed at a portion near to a front side of said camera below said spool chamber, each of said battery chamber and said capacitor being in confronting relation to said spool chamber.

6. A camera according to claim 5, further comprising a flash light emission device for emitting flash light in photo-taking, said flash light emission device being disposed at a portion near to the front side of said camera above said spool chamber.

7. A camera according to claim 5, further comprising a distance measuring device for measuring a distance to an object, said distance measuring device being disposed at a portion near to the front side of said camera above said spool chamber.

8. A camera according to claim 5, further comprising a light measuring device for measuring luminance of an object, said light measuring device being disposed at a portion near to the front side of said camera above said spool chamber.

9. A camera comprising:
   a) a cartridge chamber into which a film cartridge is loaded;
   b) a spool chamber in which a spool arranged to take up thereon a film pulled out from the film cartridge is provided;
   c) a battery chamber which houses a battery therein; and
   d) a capacitor which accumulates electric charge for flash light emission,
      wherein said battery chamber and said capacitor are juxtaposed in a width direction of said camera above or below and facing said spool chamber.

10. A camera according to claim 9, further comprising a flash light emission device for emitting flash light in photo-taking, said flash light emission device being disposed at a portion near to a front side of said camera above said cartridge chamber.

* * * * *

UNITED STATES PATENT AND TRADEMARK OFFICE
CERTIFICATE OF CORRECTION

PATENT NO. : 6,442,347 B1
DATED : August 27, 2002
INVENTOR(S) : Kenji Ito

It is certified that error appears in the above-identified patent and that said Letters Patent is hereby corrected as shown below:

<u>Column 5,</u>
Lines 45 and 49, delete "411" and insert -- 41' --.

Signed and Sealed this

Fourth Day of November, 2003

JAMES E. ROGAN
*Director of the United States Patent and Trademark Office*